(12) United States Patent
Griffin et al.

(10) Patent No.: US 9,015,843 B2
(45) Date of Patent: Apr. 21, 2015

(54) PREDICTIVE MALWARE THREAT MITIGATION

(75) Inventors: Bryan C. Griffin, Bellevue, WA (US); Vidyanand N. Rajpathak, Redmond, WA (US); Chengi Jimmy Kuo, Manhattan Beach, CA (US); Igal Figlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 12/959,949

(22) Filed: Dec. 3, 2010

(65) Prior Publication Data
US 2012/0144492 A1   Jun. 7, 2012

(51) Int. Cl.
G06F 21/50 (2013.01)
G06F 21/55 (2013.01)
G06F 21/56 (2013.01)
G06F 21/57 (2013.01)
H04L 29/06 (2006.01)

(52) U.S. Cl.
CPC .............. *G06F 21/56* (2013.01); *G06F 21/577* (2013.01); *H04L 63/1433* (2013.01); *H04L 63/1408* (2013.01); *H04L 63/1416* (2013.01)

(58) Field of Classification Search
None
See application file for complete search history.

(56) References Cited

U.S. PATENT DOCUMENTS

| 7,356,736 B2 * | 4/2008 | Natvig ..................... 714/38.12 |
| 7,424,489 B1 | 9/2008 | Duffield |
| 8,132,250 B2 * | 3/2012 | Judge et al. ..................... 726/13 |
| 8,266,698 B1 * | 9/2012 | Seshardi et al. ................ 726/24 |
| 8,468,606 B2 * | 6/2013 | Van De Weyer et al. ....... 726/25 |
| 2004/0250115 A1 * | 12/2004 | Gemmel et al. ............. 713/201 |
| 2007/0094725 A1 | 4/2007 | Borders |
| 2009/0193293 A1 * | 7/2009 | Stolfo et al. ................... 714/26 |
| 2010/0077481 A1 | 3/2010 | Polyakov |
| 2010/0125912 A1 * | 5/2010 | Greenshpon et al. .......... 726/25 |
| 2010/0275263 A1 * | 10/2010 | Bennett et al. ................ 726/25 |

FOREIGN PATENT DOCUMENTS

| CN | 101443736 A | 5/2009 |
| WO | 2007100915 A2 | 9/2007 |

OTHER PUBLICATIONS

Using Security Metrics Coupled with Predictive Modeling and Simulation to Assess Security Processes, Published date: Jun. 21, 2009, Available at: http://www.hpl.hp.com/techreports/2009/HPL-2009-142.pdf.

A Single Metric for Evaluating Security Products, Retrieved date: Aug. 12, 2010, Available at: http://www.mcafee.com/us/local_content/reports/a_single_metric_EICAR_2010.pdf.

(Continued)

*Primary Examiner* — Fatoumata Traore
(74) *Attorney, Agent, or Firm* — Kate Marochkina; Sade Fashokun; Micky Minhas

(57) ABSTRACT

The subject disclosure is directed towards protecting against malware, by classifying a user's risk level, which corresponds to a likelihood of malware being activated. To make the classification, data is collected that represents a probability of encountering malware, a probability of a user activating that malware, and the impact to the machine is activated. The classification maps to a protection level, which may be dynamically adjustable, e.g., based upon current risk conditions. The protection level determines a way to mitigate possible damage, such as by running a program as a virtualized program, running a virtualized operating system, or sandboxing a process.

20 Claims, 6 Drawing Sheets

(56) References Cited

OTHER PUBLICATIONS

IMAD: In-Execution Malware Analysis and Detection, Published date: Jul. 8, 2009, Available at: http://nexginrc.org/nexginrcAdmin/PublicationsFiles/gecco09-bilal.pdf.

Threat Management Solution, Published Date: Sep. 2008, Available at: http://uldrendmicro.com/imperia/md/content/uk/enterprise/threat_management_services/solution-deployment-guide-tms.pdf.

Cisco Adaptive Wireless Intrusion Prevention System: Protecting Information in Motion, Retrieved date: Aug. 12, 2010, Available at: http://www.cisco.com/en/US/prod/collateral/wireless/ps9733/ps9817/solution_overview_c22-478925_ns386_Networking_Solution_Solution_Overview.html.

"Office Action and Search Report Issued in Chinese Patent Application No. 201110416495.2", Mailed Date: Feb. 8, 2014, 13 Pages.

"Office Action Issued in Chinese Patent Application No. 201110416495.2", Mailed Date: Sep. 4, 2014, 11 Pages.

* cited by examiner

US 9,015,843 B2

PREDICTIVE MALWARE THREAT MITIGATION

BACKGROUND

Via the Internet, individuals and organizations with malicious intent develop software that damage computer systems and/or are used to steal the personal information of users (including individual users or entities such as companies). Such malicious software, or malware, often exploits code vulnerabilities and/or gets installed onto users' computer systems by tricking users into taking some action.

One way to protect against malware is via anti-malware software. Contemporary anti-malware software uses a variety of mechanisms to catch and quarantine malware. In most instances, signatures, behavior monitoring, and filter drivers are used to protect users from software that would otherwise damage the computer.

Contemporary anti-malware technology has led to a cycle in which the malware authors try to outsmart the anti-malware developers, and vice-versa. Sometimes the malware authors win, at least for awhile, because protection against an exploit has not yet been discovered. There are also cases where the user simply has not updated his or her machine to detect the latest malware, sometimes because the user is careless or not computer-savvy.

Other times users prefer to not burden their machines by running an antimalware product, at least not to its full capability. More particularly, many end-users complain that any anti-malware application is intrusive, creates performance bottlenecks, takes up application CPU cycles, and sometimes locks up certain files from use. As a result, it is a well-known fact that end-users end up excluding certain processes, folders, and/or file types from real-time anti-malware scanning.

What is needed is another way to protect users from malware. This includes users who are intentionally not fully compliant from a security standpoint, as well as users who naïvely click on or otherwise take action to install infected executables without realizing the consequences of their actions.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a score (e.g., a probability value) is computed that represents the risk/likelihood of malware being activated on a computing device. Based on the score, protective action may be taken to mitigate damage that otherwise may result if the malware is activated. For example, users may be classified into a risk category corresponding to the score, with high risk users protected more, e.g., by having a program that can activate malware (e.g., a browser) run as a virtualized program, or to run an operating system as a virtualized operating system. Other times, the action taken to mitigate damage may be to run a process in a sandbox. The protection level is dynamically variable, such as based upon current threat conditions and/or what the user is attempting to do.

In one aspect, the score is computed based at least in part on past user behavior data, machine state data, and/or a likelihood of encountering malware. For example, the malware-related input may be based upon file type data (e.g., files in the internet cache) associated with the user, URL data (e.g., visited sites such as with bad reputations) associated with a user, malware previously detected for a user, and/or behavior data associated with a user (e.g., clicks on email links and runs internet programs). The malware-related input may be based upon machine state, such as machine update data, patch data, user-privilege data (e.g., administrator or not) on the machine, and/or antimalware scan data (e.g., when last scanned, how thoroughly and so forth). The malware-related input also may indicate a likelihood of encountering malware, such as based upon data collected from an industry source, update data, diagnostic data submitted by users, and/or malware data submitted by users.

In one aspect, the protection level is dynamically variable based upon current threat conditions. A risk may be mitigated at a network layer within a managed environment, such as by increasing protection on a destination host, increasing auditing, and/or decreasing network access for the user and/or machine.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards providing varying levels of protection against malware based on the profile and/or historical behavior of a user. As will be understood, such varying levels of protection allow for dynamic strength adjustment of an antimalware product to protect against malware based on the tendencies of a user, which improves overall protection from threats, even when not fully compliant from a security standpoint.

As also will be understood, the technology described herein profiles user habits and machine vulnerabilities based on various data, which may include telemetry, business intelligence, data collected from system anomalies, and data collected from artificially induced abnormalities. Each user may then be classified according to the profile based on mathematical models and patterns, from which (at runtime) a vulnerability score and protection mechanism may be computed. Also described is the ability to prescribe threshold levels for heuristic signatures used by antimalware scanners, and the ability to mitigate threats at the network layer based on user classification and/or machine classification.

It should be understood that any of the examples herein are non-limiting. For one, various probability models are described as examples, however other such models may be alternatively developed and used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in protection against malware in general.

Figure 1:
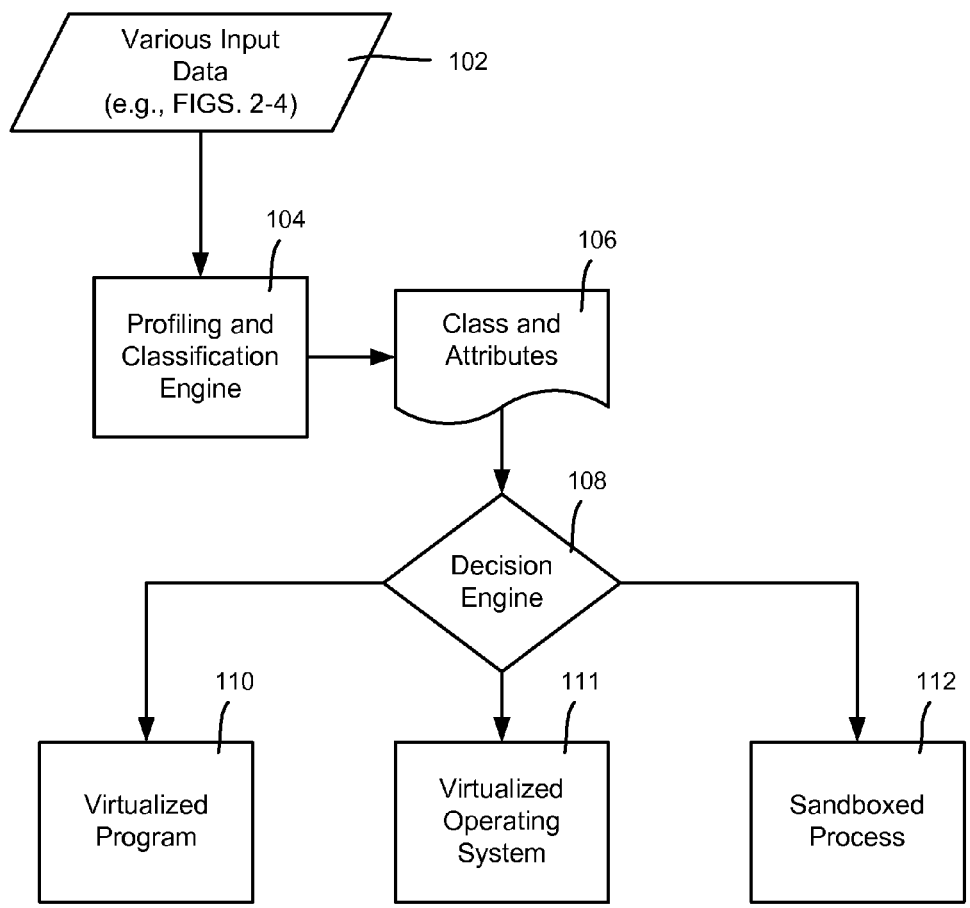
FIG. 1 is a block diagram/dataflow diagram representing components that classify a user based upon various input data, and determine and apply a protection level for the user based upon the classification.

FIG. 1 shows example components of a system for predictive malware threat mitigation, which may be run on a user's computer, in a cloud service, in a distributed computing environment, and so forth, or in some combination thereof. In general, malware-related input data 102 are received at a profiling and classification engine 104, which, based on this data 102, computes a class for a user and also provides attributes 106, as described below. Various types of data are feasible for input, including data as to what malware is currently causing problems, data about the state of a user's machine, and data about the user. More specific examples of input data are described below with reference to FIGS. 2-4, and in general provide information that may be used to determine the probability of a user encountering malware (FIG. 2), the probability of the user's machine being affected by the malware (FIG. 3), and the probability of the user activating malware (FIG. 4).

In one implementation, based on the data 102, the classification engine 104 computes a risk level, or predictive score, which indicates how vulnerable the user's computer is to being infected with malware, relative to other computers/users. As can be readily appreciated, telemetry, business intelligence, and mathematical models to calculate the probability of a random occurrence may be used in the computations.

The classification may be regularly updated, such as whenever the user performs some action that may change the users' score. Moreover, even if the score does not change, the class attributes may change, and thus the protective action with respect to that classification. For example, if a particularly bad virus is spreading, a score that normally makes a user a low-risk user may map the user into a different category, whereby different mitigation actions may be taken (described below) until the threat diminishes. Note that any such information and/or component updates described herein may be pushed and/or pulled from a network connection, such as a cloud service, so that the latest protection is available; any component such as the engines 104 and 108 may similarly reside locally or remotely, or partially locally and remotely.

Based upon this score and the other available information, a decision engine 108 operates to protect the user's computer. More particularly, in one implementation the decision engine 108 makes use of the risk, class, and attribute information and decides an appropriate way to extend the protection of the user based on the action that the user wants to perform. This may be determined through conditional probability defined as $$P(X \mid Y) = \frac{P(X \cap Y)}{P(Y)},$$

where the probability of an occurrence of X is altered with a known occurrence of Y.

Figure 2:
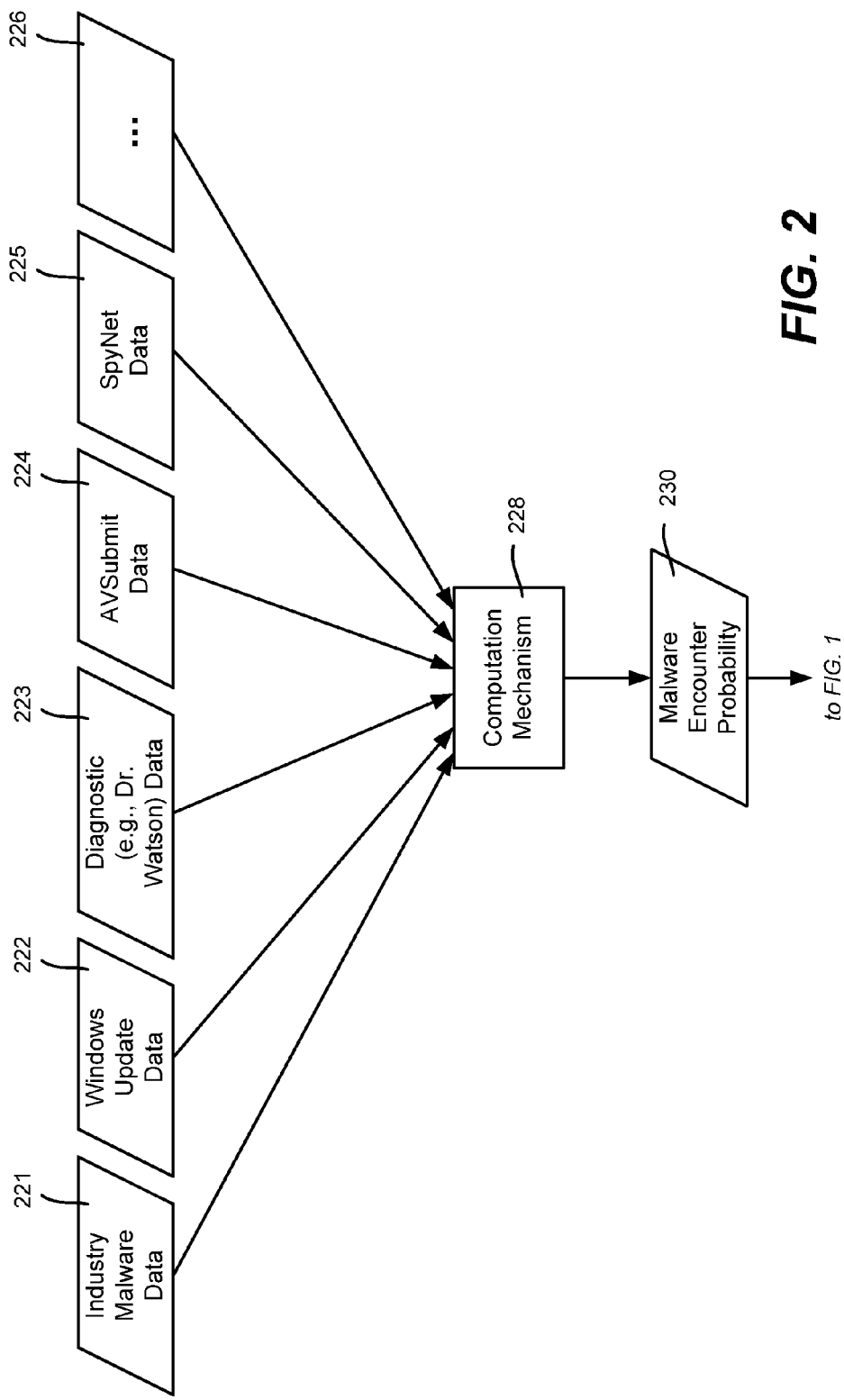
FIG. 2 is a diagram representing data collected from various sources that provide information as to the probability of a user/machine encountering malware.

FIG. 2 presents an example flow of information in a model for calculating the probability $P_\epsilon$ of a user encountering malware via website, email, or embedded in a file. The value of $P_\epsilon$ is determined from collected data of various sources, and may provide information/statistics such as the number of known active malware websites, email viruses and scams, and also files and file formats that are vulnerable to embedded malicious content. Example sources 221-226 of such data include industry malware data, Windows® update data, diagnostic (e.g., Dr. Watson) data of many users, user-submitted antivirus data and SpyNet data; block 226 represents other sources of such information that may be used. Note that various organizations may collect such data, which they may share.

With this information, including the associated rate of growth of a threat, the system can compute a score indicative of the possible exposure to a threat, whether threats in general or a specific threat. In one implementation, a computation mechanism 228, such as trained based upon known data to determine relative weights for each source, may output the score as a malware encounter probability $P_\epsilon$ value 230. Further training data may be collected in an ongoing manner and regularly used to retune the weights, for example.

Figure 3:
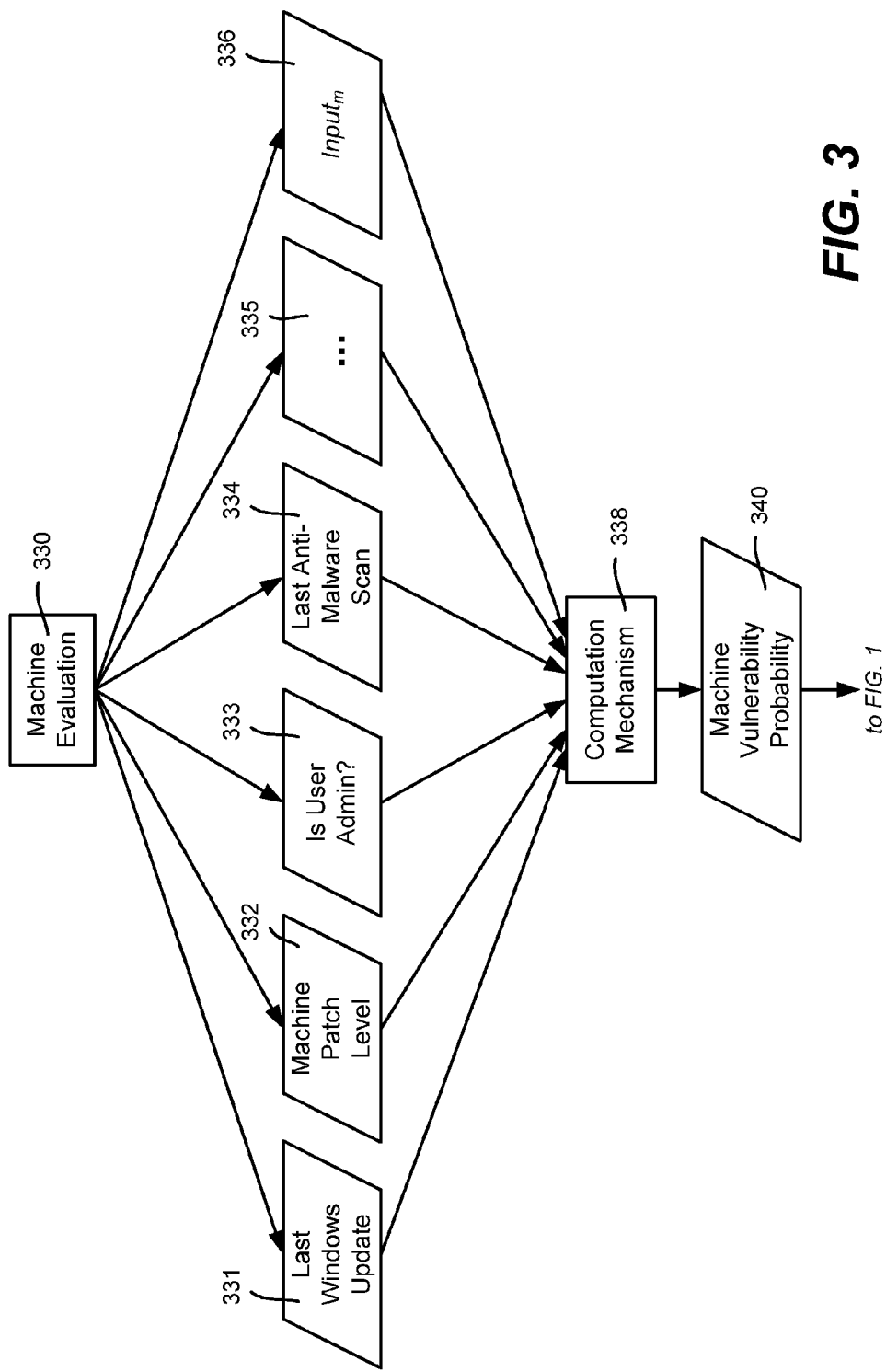
FIG. 3 is a diagram representing machine state data that provide information as to the probability of a machine being affected by malware.
Figure 4:
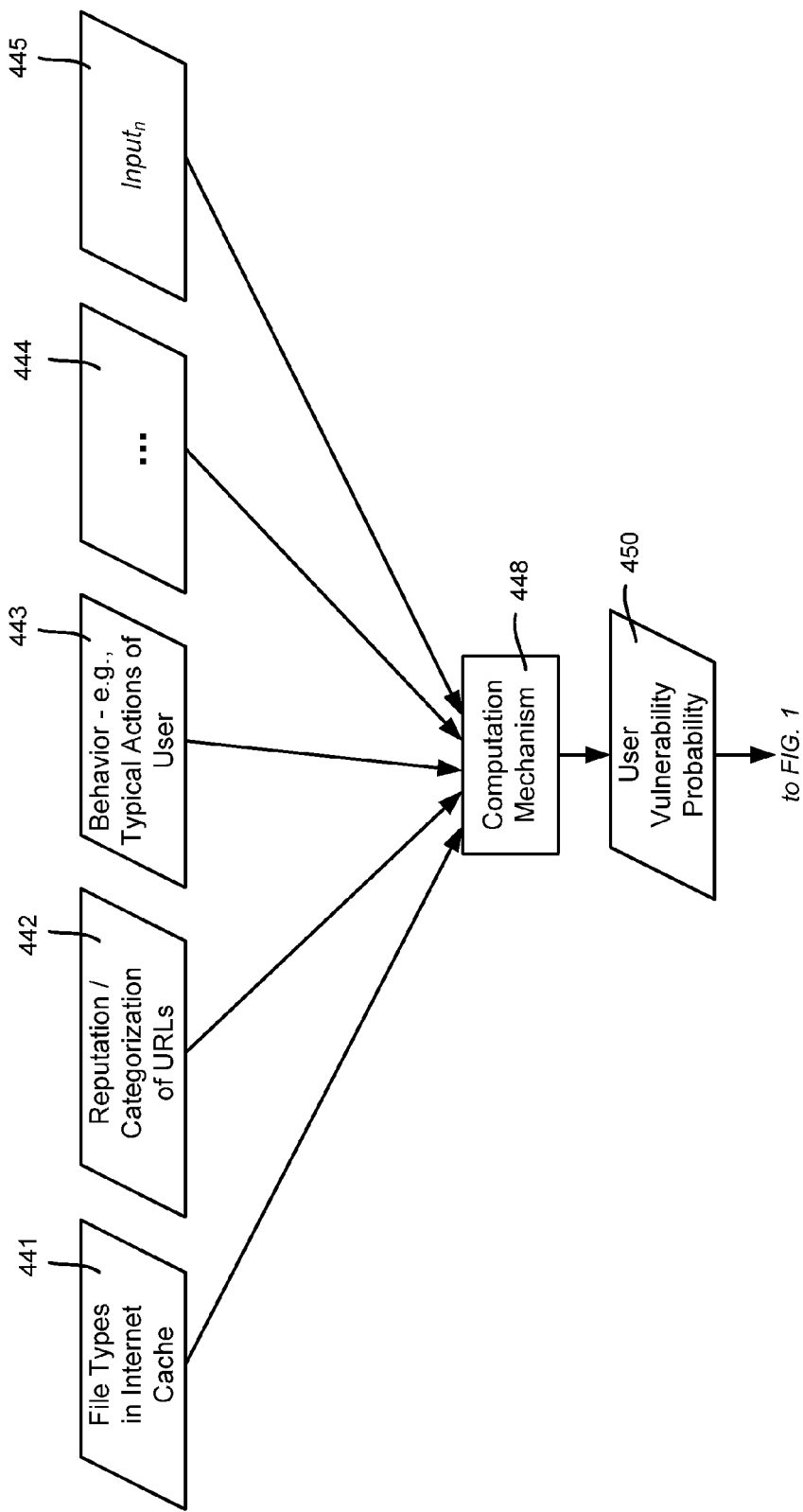
FIG. 4 is a diagram representing user behavior and other user-related data that provide information as to the probability of a user activating malware.

FIG. 3 provides an example data flow for determining the user's machine vulnerability. This model takes into consideration attributes and other state data about the user's machine that may make it more or less susceptible to exploit or infection. A machine evaluation mechanism 330 reads various machine-related state data to obtain information such as the last Windows update (on a Windows® machine) 331, the patch level of a machine 332, whether the user is an administrator 333 (which may be a value representing a privilege level indicative of how much harm the user can do to the machine), and data regarding the last malware scan 333 that was performed. The freshness of this data also may be a factor. Block 335 represents other internal machine sources that may be used, e.g., the last time a system restore was performed, whether the machine is a shared or personal machine, and so on. In addition to this data, other external and/or internal information 336 may be used, such as regarding the configuration of the user's particular machine compared to that of other like machines, (which may be obtained from telemetry data in databases such as Dr. Watson).

A computation mechanism 338, e.g., trained on known data to determine relative weights for each source 331-336, computes a score as to the machine's vulnerability. In one implementation, the score comprises a machine vulnerability probability $P_v$ value 340 indicative of how much the user's machine is deemed vulnerable. Note that from this process, certain attributes about the machine also may be obtained, which can be forwarded and used by the decision engine 108 (FIG. 1) as described above, in addition to the vulnerability score.

Another set of inputs that facilitate the overall predictive malware protection model is exemplified in FIG. 4, namely input directed towards user behavioral modeling. Examples of sources that provide insight on the user's computing/behavior patterns include the types of files executed (e.g., as maintained in the internet cache) 441, the types of websites visited (e.g., the reputation/categorization of the maintained URLs) 442, typical actions of the user, such as email interactions (e.g., clicks on links in the message body or not, runs downloaded executables or not), and so on. The freshness of this data also may be a factor. Other internal and external information sources are represented by blocks 444 and 445. Examples include how the user was previously classified, so that the user does not go from previously being a high-risk user to suddenly being a low-risk user (because the user did something like clean out the internet cache and history, for example), and so forth. Other examples may include what malware has been previously remediated (cleaned, removed, quarantined) in the past for this user, how this user matches up with other users who have had malware problems, and so on.

This user vulnerability model, e.g., corresponding to a trained computation mechanism 448, provides a score reflecting how likely the user will activate a piece of malware. In one implementation, the score comprises a probability value $P_\alpha$ (block 450).

Returning to FIG. 1, these computed data points 230, 340 and 450 (and possibly others) provide a foundation for an overall risk computation, e.g., $R = P_v * P_\epsilon * P_\alpha * \ldots P_n$, as to the likelihood of a user having his or her machine affected by a piece of malware. Note that these values may be separately weighted, such as by machine learning, so that each factor need not give equal weight to the risk computation.

It should be noted that FIGS. 1 through 4 describe only one example of risk determination, which divides available data into malware-related data, machine related data and user-related data for computing the respective probabilities. It is feasible to have other divisions of data, or no divisions at all, e.g., all of the available data may be input as feature data into a trained model, such as with learned feature weights, that provides a single model (rather than combining probabilities computed by multiple models).

Regardless of how computed and/or classified, a computer system may use the risk determination in various ways. For example, the decision engine 108 may examine the action that the user wishes to take, and apply an amount of protection corresponding to the computed risk; for a high-risk user, more care may be taken to prevent the user from causing harm to the computer and/or to prevent confidential information from being compromised. Examples of some real time strategies for mitigation of potential threats based on the outcome of the decision engine 108 include known ways to prevent harm, such as running a program as a virtualized program (block 110), running a virtualized operating system (block 111) that can be reverted if damaged, running a process in a sandbox (block 112) or other restricted way, and so forth. Another type of mitigation may be to change a program's (e.g., the browser's) security settings. Depending on the classification, some users may be warned about a pending action, while others are prevented from taking the action, e.g., with no override capabilities. The risk level may be compared with threshold levels for heuristic signatures, so that the burden on the machine of scanning every incoming and outgoing file may be avoided in many instances. Moreover, thresholds in the definition rules in antivirus/antimalware scanning engines can be adjusted based on the computed results, e.g., heuristic thresholds may be increased for higher risk users, and/or more rules may be used to change the threshold so that more files are deemed to be suspicious in unsafe environments and be scanned more thoroughly.

By way of example, consider a first user that sometimes accidentally navigates to random URLs that may be malicious, has previously clicked on random pop-ups, has had a malware infection, and uses a machine that does not have the latest security fixes. The profiling and classification engine 104 rates this user "high risk" and uses this rating to decide how to provide appropriate protection to avoid further trouble. Based on the high risk determination, the decision engine virtualizes the web browser program (e.g., operating system component) when browsing the Web, whereby a browser helper object or some other exploit is contained to the virtualized instance of the program. Any downloaded software increases suspicion levels to make them more likely to be flagged as malicious, in need of scanning and/or sent to a web service for further examination.

Consider a second, experienced computer user who typically keeps her machine updated with the latest security patches and signatures. The user may be determined to be something less than a high risk, although not necessarily a low risk, such as because of sometimes having downloaded movies or audio from untrusted sites. A movie downloaded from such a site may launched in a Media Player instance that has been sandboxed, in order to prevent any potential malicious content from causing an issue.

Consider an experienced (third) computer user whose personal computer is fully updated and protected in such a way that the profiling and classification engine 104 provides a "low-risk" rating that allows freedom to browse, download, and execute files. If the user receives an email from a friend who has been hacked, e.g., the email has an attachment which is a JPG file containing a new JPG exploit variant, such that the file may be downloaded without the signatures being detected. However, while this will infect the machine, the telemetry is sent to the data warehouse so that other users' of the same anti-malware software can be protected until a full analysis and signature can be produced.

As a fourth example, consider a user who receives email from vendors on his IT-managed desktop. The user is rated a "low-risk" because he does not use his computer for anything but work, and it is a managed desktop. If he receives a document containing a virus from a sender he thinks is trusted, but in actuality that sender's email has been spoofed, there is a potential problem because his rating allows the document to be opened. However, because the file came from a spoofed email address, suspicion levels are elevated, whereby this document is scanned, and the virus is recognized by its signature. Not only is the threat detected, but the data learned from this event may be used to catch the threat at a higher layer the next time.

The scoring methodologies described herein also may be used to mitigate risk at the network layer within a managed environment, where a network management system can monitor the activity of a user and/or machine across enterprise systems. A machine may be suspected as compromised if it attempts to infect other machines, attempts to attack the enterprise network, and/or exhibits some irregular behavior. A user may be suspected as being compromised if the user attempts to send infected email, attempts to access restricted resources, or attempts to transmit sensitive data out of the network. In such an event, there will be a higher probability of discovering malware contributing to a higher risk score. As a result, the network management system may use this input to further mitigate the threat, e.g., by increasing protection on a destination host, increasing auditing, or decreasing network access for the user and/or machine.

Anti-malware products leveraging the technology described herein thus add to the defense-in-depth strategy for users, and reduce the spread of malware. This may help reduce the attempts to author malware, as via telemetry feedback, malware identification and mitigation can be accomplished rapidly, making it less successful.

As can be seen, there is provided a technology that uses various information to provide software that is able to protect users by dynamically and predictively mitigating risks through various mechanisms. The technology uses industry data about known threats to understand the risks that exist on the Internet, along with data about the user's machine, knowledge of like machines, and information about the user. The model classifies the user and assigns attributes to the user based on this information, which in turn allow a decision to make predictive actions that protect the user. This may be for users who do not have traditional malware protection, or have limited it in some way, as well as for users who have full traditional malware protection, with an additional layer of security thereby improving overall user protection.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
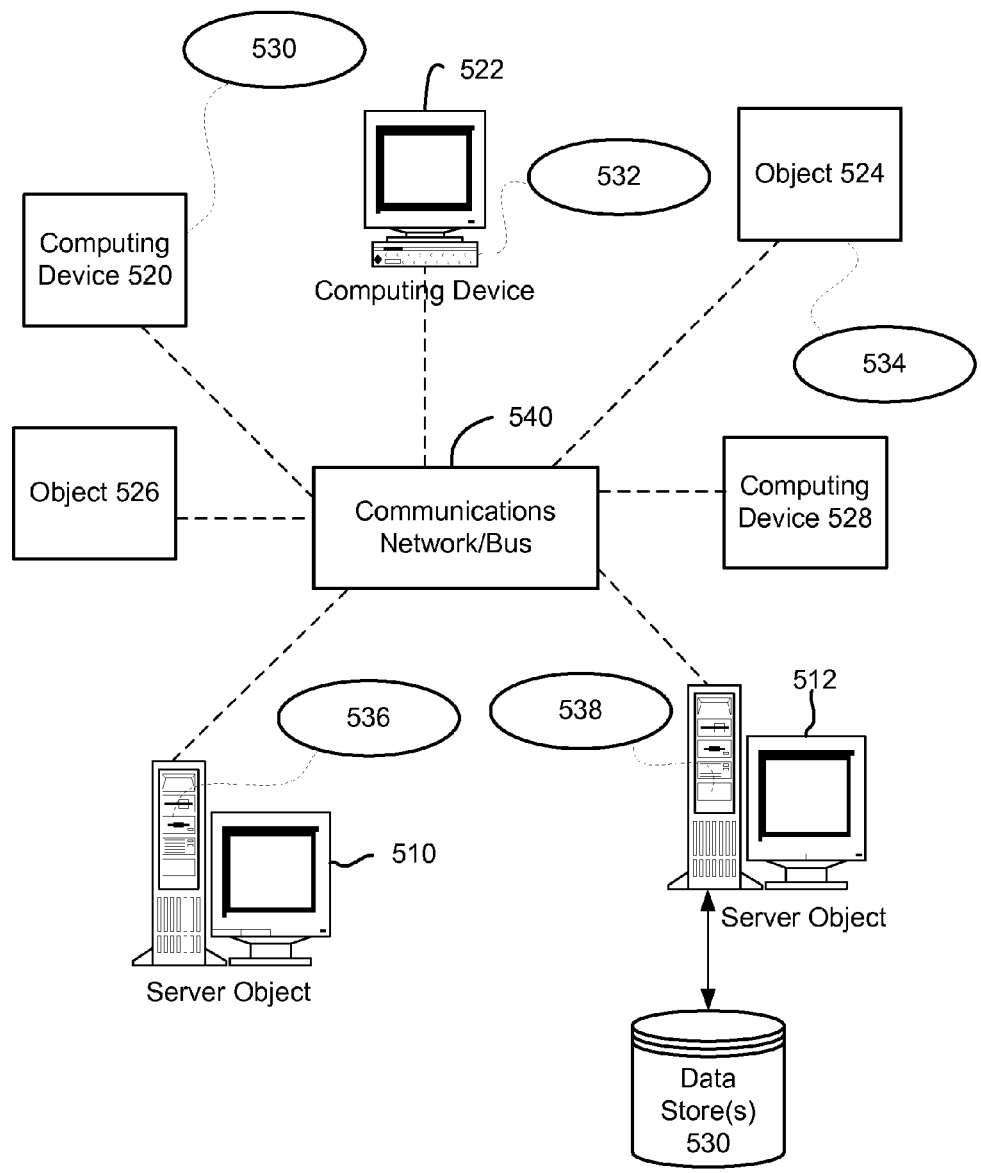
FIG. 5 is a block diagram representing exemplary non-limiting networked environments in which various embodiments described herein can be implemented.

FIG. 5 provides a schematic diagram of an exemplary networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
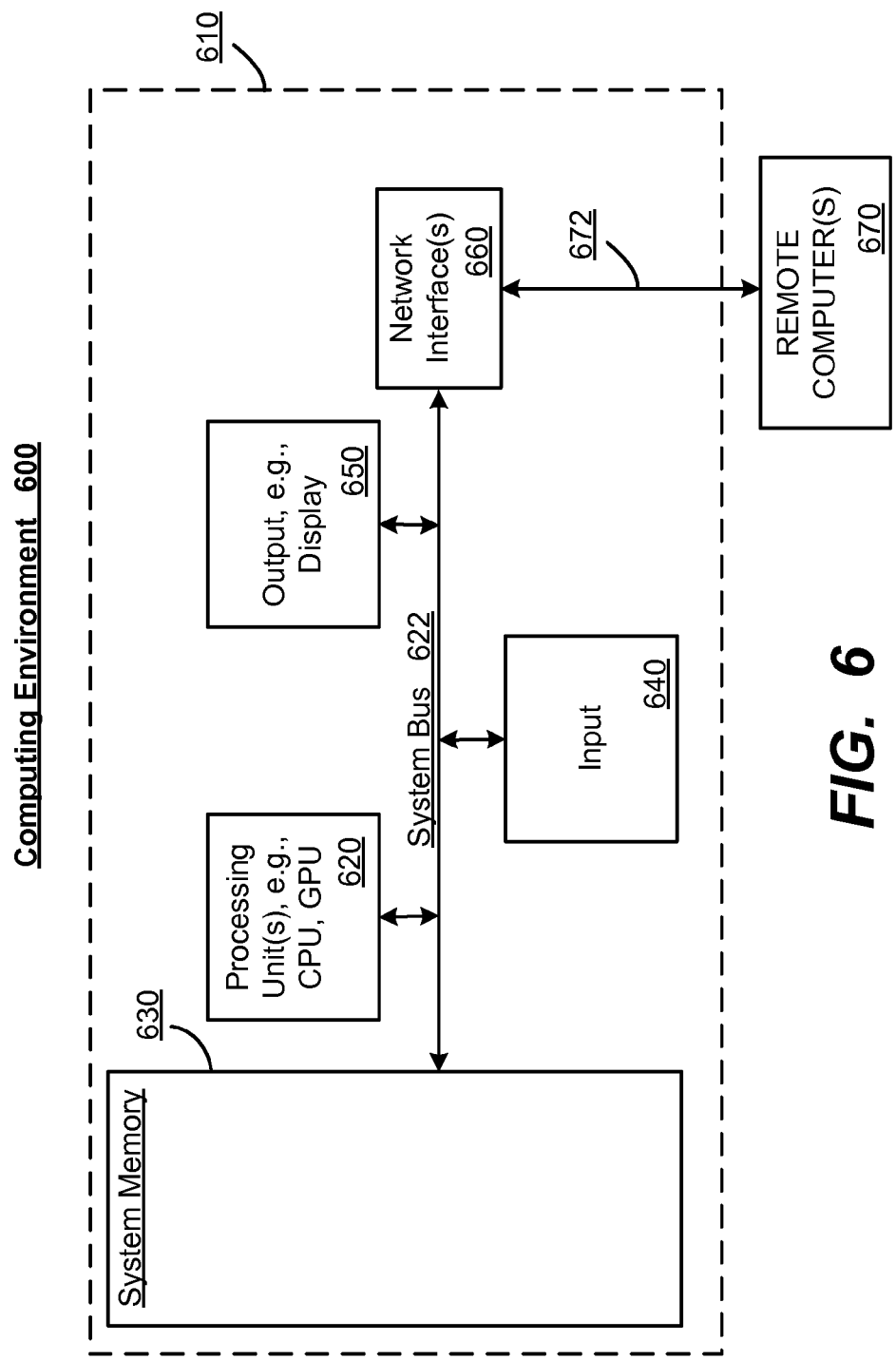
FIG. 6 is a block diagram representing an exemplary non-limiting computing system or operating environment in which one or more aspects of various embodiments described herein can be implemented.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the exemplary computing system environment 600.

With reference to FIG. 6, an exemplary remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
   computing a score indicative of a likelihood of malware being activated on a computing device based upon vulnerability model data and past user behavior data in which the score comprises a probability of encountering the malware, a probability of a user activating the malware, and a probability of the computing device being affected by the malware if activated; and
   based on the score, taking a protective action to mitigate damage that otherwise is able to result if the malware is activated.

2. The method of claim 1 wherein computing the score comprises determining a probability value based at least in part on the past user behavior data.

3. The method of claim 1 wherein computing the score comprises determining a probability value based at least in part on machine state data.

4. The method of claim 1 wherein computing the score comprises determining a probability value based at least in part on a likelihood of encountering malware.

5. The method of claim 1 wherein computing the score comprises determining a classification, and mapping the classification to a protection level corresponding to possible protective actions, in which the protection level is dynamically variable based upon current threat conditions.

6. The method of claim 1 wherein taking action to mitigate damage comprises adjusting one or more heuristic thresholds, or adjusting a risk level evaluated against the one or more heuristic thresholds.

7. The method of claim 1 wherein taking action to mitigate damage comprises running a program as a virtualized program.

8. The method of claim 1 wherein taking action to mitigate damage comprises running an operating system as a virtualized operating system.

9. The method of claim 1 wherein taking action to mitigate damage comprises running a process in a sandbox.

10. The method of claim 1 wherein taking action to mitigate damage comprises mitigating risk at a network layer within a managed environment, including increasing protection on a destination host, increasing auditing, or decreasing network access for the user or machine or both a user and a machine, or any combination of increasing protection on a destination host, increasing auditing, or decreasing network access for the user or machine or both a user and a machine.

11. In a computing environment, a system, comprising:
    at least one processor;
    a memory communicatively coupled to the at least one processor and including components comprising:
      a classification engine configured to process input data corresponding to a plurality of data sources into at least one predictive model corresponding to a risk of a user activating malware on a computing device, the input data comprising behavior data of the user including past user behavior data, and to determine a classification corresponding to the risk of the user activating malware on the computing device; and
      a decision engine configured to evaluate the classification with respect to available protective actions, to determine whether a protective action is needed for the user, and if so, to take action to protect the user with respect to activating malware.

12. The system of claim 11 wherein at least some of the malware-related input is received from a remote location relative to the computing device.

13. The system of claim 11 wherein the classification engine, or the decision engine, or both, operate at a remote location relative to the computing device.

14. The system of claim 11 wherein the malware-related input is based upon file type data associated with a user, URL data associated with a user, or malware previously detected for a user, or any combination of file type data associated with a user, URL data associated with a user, or malware previously detected for a user.

15. The system of claim 11 wherein the malware-related input is based upon update data associated with a machine, patch data associated with a machine, user-privilege data associated with a machine, or antimalware scan data associated with a machine, or any combination of update data associated with a machine, patch data associated with a machine, user-privilege data associated with a machine, or antimalware scan data associated with a machine.

16. The system of claim 11 wherein the malware-related input corresponds to a likelihood of encountering malware based upon data collected from an industry source, update data, diagnostic data, or malware data submitted by users, or based upon any combination of data collected from an industry source, update data, diagnostic data, or malware data submitted by users.

17. The system of claim 11 wherein the decision engine is configured take action to protect the user, including by running an program as a virtualized program, running an operating system as a virtualized operating system, running a process in a sandbox, or determining whether to scan for signatures based on the classification, or any combination of running a program as a virtualized program, running an operating system as a virtualized operating system, running a process in a sandbox, or determining whether to scan for signatures based on the classification.

18. The system of claim 11 further comprising, a network communications mechanism that takes action to protect the user or a machine, or both a user and a machine, at a network layer within a managed environment.

19. In a computing environment, a method performed at least in part on at least one processor, comprising:

providing data corresponding to a probability of encountering malware, a probability of a user activating malware, and a probability of machine being affected by malware if activated; and using the data to determine a level of protection for a user or a machine, or both a user and a machine, with respect to activating malware based on a combination of the probability of encountering malware, the probability of a user activating malware, and the probability of machine being affected by malware if activated, the level of protection comprising a strength of antimalware protection.

20. The method of claim 19 wherein using the data to determine a level of protection comprises, classifying the user into a class, and mapping the user to a dynamic level of protection based upon the class and current threat data.

* * * * *